United States Patent
Pearson

(10) Patent No.: US 12,515,890 B2
(45) Date of Patent: Jan. 6, 2026

(54) INVERTING CONVEYOR SYSTEM FOR FLEXIBLE ARTICLES OF MANUFACTURE

(71) Applicant: Purple Innovation, LLC, Lehi, UT (US)

(72) Inventor: Brett Pearson, Taylorsville, UT (US)

(73) Assignee: Purple Innovation, LLC, Lehi, UT (US)

( * ) Notice: Subject to any disclaimer, the term of this patent is extended or adjusted under 35 U.S.C. 154(b) by 206 days.

(21) Appl. No.: 18/236,148

(22) Filed: Aug. 21, 2023

(65) Prior Publication Data
US 2025/0066138 A1 Feb. 27, 2025

(51) Int. Cl.
*B65G 47/252* (2006.01)
*A47C 27/14* (2006.01)
*B65G 37/00* (2006.01)

(52) U.S. Cl.
CPC ......... *B65G 47/252* (2013.01); *B65G 37/005* (2013.01); *A47C 27/14* (2013.01)

(58) Field of Classification Search
CPC .... B65G 47/252; B65G 37/005; A47C 27/14; B68G 15/00; B65H 2701/174; B65H 15/00
See application file for complete search history.

(56) References Cited

U.S. PATENT DOCUMENTS

| | | | | |
|---|---|---|---|---|
| 3,370,849 A | * | 2/1968 | Martin | A41H 43/0214 38/143 |
| 4,533,132 A | * | 8/1985 | Wangermann | B42C 1/12 270/52.18 |
| 4,715,594 A | * | 12/1987 | Isobe | B65H 29/40 271/291 |
| 4,799,613 A | | 1/1989 | Adamson | |
| 4,995,162 A | * | 2/1991 | Betere Cabeza | B68G 7/00 29/564.2 |

(Continued)

FOREIGN PATENT DOCUMENTS

| CN | 105460283 A | * | 4/2016 |
|---|---|---|---|
| CN | 109665277 A | | 4/2019 |

(Continued)

OTHER PUBLICATIONS

International Search Report and Written Opinion dated Dec. 19, 2024, for PCT/US2024/043294.

*Primary Examiner* — Gene O Crawford
*Assistant Examiner* — Abby A Jorgensen
(74) *Attorney, Agent, or Firm* — Foley & Lardner LLP

(57) ABSTRACT

An inverting conveyor system includes a series of conveyors that can invert a flexible article of manufacture, such as a cushioning element (e.g., a cushioning element of a mattress, etc.) formed from an elastomeric gel. The inverting conveyor system includes a first conveyor, a second conveyor, and an optional third conveyor. The first conveyor receives the flexible article of manufacture in an inverted orientation. The second conveyor is associated with the first conveyor in a manner that enables inversion of the flexible article of manufacture from the inverted orientation to an upright orientation. The optional third conveyor receives the flexible article of manufacture from the second conveyor and transports it to a desired destination. Methods for inserting flexible articles of manufacture are also disclosed.

21 Claims, 16 Drawing Sheets

(56) References Cited

U.S. PATENT DOCUMENTS

| | | | | |
|---|---|---|---|---|
| 5,515,796 A * | 5/1996 | Ogle | ............... | D05B 11/005 |
| | | | | 198/403 |
| 6,142,287 A * | 11/2000 | Biffert | ............. | B65G 47/252 |
| | | | | 198/402 |
| 6,546,698 B1 * | 4/2003 | Focke | .............. | B65B 25/143 |
| | | | | 53/446 |
| 7,244,174 B2 * | 7/2007 | Schill | ............. | A22C 25/17 |
| | | | | 452/130 |
| 7,530,442 B2 * | 5/2009 | Gerke | ............. | B65H 29/686 |
| | | | | 198/402 |
| 2002/0057962 A1 * | 5/2002 | Block | .............. | D05B 11/005 |
| | | | | 414/769 |
| 2004/0248509 A1 | 12/2004 | Schill | | |
| 2005/0247547 A1 * | 11/2005 | Frost | .............. | B65G 47/248 |
| | | | | 198/417 |
| 2008/0273958 A1 * | 11/2008 | Resta | .............. | D05B 11/005 |
| | | | | 414/759 |
| 2018/0148275 A1 * | 5/2018 | Whatcott | .......... | B65G 51/03 |

FOREIGN PATENT DOCUMENTS

| | | | | |
|---|---|---|---|---|
| DE | 1454072 A1 * | 10/1969 | | |
| DE | 10 2012 222 914 A1 | 6/2014 | | |
| EP | 2743193 A1 * | 6/2014 | ......... | B65G 47/252 |
| JP | 62021617 A * | 1/1987 | | |

\* cited by examiner

INVERTING CONVEYOR SYSTEM FOR FLEXIBLE ARTICLES OF MANUFACTURE

TECHNICAL FIELD

This disclosure relates generally to conveyors. More specifically, this disclosure relates to conveyors that can invert articles of manufacture. Even more specifically, this disclosure relates to conveyors that can invert large, flexible articles of manufacture, such as elastomeric cushioning elements for mattresses. This disclosure also relates to methods for conveying large, flexible articles of manufacture, such as elastomeric cushioning elements for mattresses.

RELATED ART

Some mattresses include cushioning elements formed from elastomeric gels, such as oil-extended A-B-A triblock copolymers. Due to the density of elastomeric gels, cushioning elements formed from elastomeric gels can be very cumbersome. Accordingly, conveyors are often used to transport these cushioning elements from the location where they are manufactured (e.g., an injection molding machine, etc.) to locations where they are processed and assembled with other components of a mattress.

While existing conveyors effectively transport a cushioning element formed from an elastomeric gel from one location to another, processing of the cushioning element and/or its assembly with other components of a mattress often requires that the cushioning element be flipped over, or inverted. Inversion of such a cushioning element has typically been performed manually. Due to the size and weight of the cushioning element and the highly flexible nature of elastomeric gel from which the cushioning element is formed, manual inversion of the cushioning element is typically difficult, can be time-consuming, and may be dangerous.

SUMMARY

This disclosure, in various aspects, relates to apparatuses, systems, and methods for flipping over, or inverting, flexible articles of manufacture, such as large cushioning elements formed from elastomeric gels. Such an apparatus may also be referred to herein as an "inverting apparatus" or as an "inverting conveyor."

An apparatus for inverting a flexible article of manufacture (e.g., a cushioning element for a mattress, with the cushioning element being formed from an elastomeric gel; etc.) may include a first conveyor and a second conveyor. The first conveyor may receive the flexible article of manufacture in a first orientation (e.g., an upside-down orientation, etc.) and move the flexible article of manufacture in a first direction. The first conveyor may include an end from which a first end of the flexible article of manufacture drops while the first conveyor moves the flexible article of manufacture in the first direction. The second conveyor may be positioned partially beneath the first conveyor, with an end portion of the second conveyor extending laterally beyond the end of the first conveyor. Such an arrangement may enable the end portion of the second conveyor to receive the first end of the flexible article of manufacture as it drops from the end of the first conveyor. As the end of the flexible article of manufacture drops onto the end portion of the second conveyor, the second conveyor may move in a second direction opposite from the first direction. Such movement may progressively invert the flexible article of manufacture to a second orientation (e.g., an upright orientation, etc.).

Upon receiving a second end of the flexible article of manufacture, which is opposite from the first end of the flexible article of manufacture, the second conveyor may move in the first direction to convey the flexible article of manufacture, which has now been inverted (e.g., to the upright orientation, etc.) in the first direction.

Optionally, the apparatus may include a third conveyor. The third conveyor may receive the flexible article of manufacture from the second conveyor and convey the flexible article of manufacture in the first direction. As the flexible article of manufacture moves from the second conveyor, initially the second conveyor and the third conveyor may both move in the first direction. Once a sufficient portion of the flexible article of manufacture (e.g., at least half, a majority, etc.) is on the third conveyor but the first end of the flexible article of manufacture remains on the second conveyer, the second conveyor may stopped, or movement of the second conveyor in the first direction may be terminated, while the third conveyor may continue to move in the first direction. Such movement may remove any gathering or compression that has occurred along the length of the flexible article of manufacture, which may elongate the flexible article of manufacture (i.e., increase a distance between the second end and the first end of the flexible article of manufacture, etc.).

In another aspect, an apparatus for transporting an elastomeric cushioning element of a mattress (e.g., a cushioning element formed from an elastomeric gel, etc.) includes a first conveyor and a second conveyor. The first conveyor may receive the elastomeric cushioning element in a first orientation (e.g., an upside-down orientation, etc.) with a scrim fabric on an upward facing surface of the elastomeric cushioning element. The first conveyor may move the elastomeric cushioning element in a first direction. In addition, the first conveyor may include an end from which a first end of the elastomeric cushioning element drops while the first conveyor moves the elastomeric cushioning element in the first direction. The second conveyor may be positioned partially beneath the first conveyor, with an end portion of the second conveyor extending laterally beyond the end of the first conveyor. Such an arrangement may enable the second conveyor to receive the first end of the elastomeric cushioning element as it drops from the end of the first conveyor. As the second conveyor receives the end of the elastomeric cushioning element, the second conveyor may move in a second direction opposite from the first direction of the first conveyor. Movement of the second conveyor in the second direction may progressively invert the elastomeric cushioning element to a second orientation (e.g., an upright orientation, etc.), with the scrim fabric on a downward facing surface of the elastomeric cushioning element (i.e., against the second conveyor).

Upon receiving a second end of the elastomeric cushioning element (i.e., an end of the elastomeric cushioning element opposite from its first end), the second conveyor may move in the first direction to convey the inverted elastomeric cushioning element in the first direction.

Optionally, the apparatus may include a third conveyor. The third conveyor may receive the elastomeric cushioning element from the second conveyor and convey the elastomeric cushioning element in the first direction. As the elastomeric cushioning element moves from the second conveyor and onto the third conveyor, the second conveyor and the third conveyor may both move in the first direction.

Once a sufficient portion of the elastomeric cushioning element (e.g., at least half, a majority, etc.) is on the third conveyor but the first end of the elastomeric cushioning element remains on the second conveyer, the second conveyor may stopped, or movement of the second conveyor in the first direction may be terminated, while the third conveyor may continue to move in the first direction. Such movement may remove any gathering or compression that has occurred along the length of the elastomeric cushioning element, which may elongate the elastomeric cushioning element (i.e., increase a distance between the second end and the first end of the elastomeric cushioning element, etc.).

Systems that include an apparatus for inverting a flexible article of manufacture may include a manufacturing device, one or more processing devices, and/or one or more assembly devices. The manufacturing device may comprise an injection mold. Optionally, the manufacturing device may also include a scrim feeder associated with the injection mold. The one or more processing devices may include devices that allow the flexible article of manufacture to cool, devices that apply coatings (e.g., an anti-tack material, etc.) to the flexible article of manufacture, or the like. The one or more assembly devices may include stations at which other components are assembled with and/or secured to the flexible article of manufacture.

A method for conveying an article of manufacture (e.g., an elastomeric cushioning element, such as a cushioning element formed from an elastomeric gel, an elastomeric cushioning element for a mattress, etc.) may include conveying the article of manufacture in a first direction. The method may also include freeing a first end or a first edge of the flexible article of manufacture and then conveying the first end of the flexible article of manufacture in a second direction opposite from the first direction while continuing to convey a remainder of the flexible article of manufacture in the first direction. Such movement may initiate inversion, or flipping, of the flexible article of manufacture. As a portion of the flexible article of manufacture continues to move in the first direction, the flexible article of manufacture is progressively freed from movement in the first direction. The freed portions may then be progressively conveyed in the second direction to progressively invert the flexible article of manufacture until the flexible article of manufacture has been completely flipped. Conveyance of different parts of the flexible article of manufacture in different directions may continue until a second end of the elastomeric cushioning element is freed from movement in the first direction, inverted, and conveyed in the second direction.

Once the flexible article of manufacture has been inverted (e.g., completely, etc.), it may again be moved in the first direction. Initially, the entire flexible article of manufacture may be moved in the first direction. As the leading end or edge (e.g., the second end or second edge, etc.) of the flexible article of manufacture continues to move in the first direction, movement of the trailing end or edge of the flexible article of manufacture may be stopped, or terminated. Such movement may remove any gathering or compression that has occurred along the length of the flexible article of manufacture, which may elongate the flexible article of manufacture (i.e., increase a distance between the leading end or edge and the trailing end or edge of the flexible article of manufacture.

With the flexible article of manufacture inverted and removed from the second conveyor, the flexible article of manufacture may be subjected to further processing. As an example, in embodiments where the flexible article of manufacture is a cushioning element (e.g., a cushioning element of a mattress, etc.) formed from an elastomeric gel, a scrim fabric or other support material on which the flexible article of manufacture was formed may be located beneath the flexible article of manufacture. With the opposite surface of the flexible article of manufacture exposed (e.g., facing upwardly, etc.), another scrim fabric or other support material may be placed on and secured to (e.g., with an adhesive, by melt bonding, etc.) the exposed surface.

Other examples of further processing may include assembly of the flexible article of manufacture with other components of a finished product (e.g., a mattress, a cushion, a pillow, etc.), packaging of the flexible article of manufacture, and the like.

Other aspects of the disclosed subject matter, as well as features and advantages of various aspects of the disclosed subject matter, should become apparent to those of ordinary skill in the art through consideration of the ensuing description, the accompanying drawings, and the appended claims.

BRIEF DESCRIPTION OF THE DRAWINGS

In the drawings,

FIG. 6 shows the flexible article of manufacture on a first conveyor of the inverting conveyor in an upside-down orientation;

FIG. 7 shows a first end or edge, or a leading end or edge, of the flexible article of manufacture falling onto a second conveyor of the inverting conveyor;

FIGS. 8 and 9 show the flexible article of manufacture being progressively inverted from the upside-down orientation shown in FIG. 6 to an upright orientation while the first conveyor continues to advance the flexible article of manufacture in a forward direction and the second conveyor progressively pulls the first end or edge of the flexible article of manufacture in a rearward direction;

FIGS. 10 and 11 show a second end or edge, or a trailing end or edge, of the flexible article of manufacture falling off of the first conveyor, with the entire flexible article of manufacture in the upright orientation;

FIG. 12 shows the second end or edge, or the trailing end or edge, of the flexible article of manufacture being pulled onto the second conveyor;

FIGS. 13-15 show the second conveyor advancing the flexible article of manufacture, now in the upright orientation, with the second end or edge of the flexible article of manufacture becoming the leading end or edge of the flexible article of manufacture;

FIG. 16 shows the use of an optional third conveyor to further advance the flexible article of manufacture while removing at least some gathering or compression that has occurred along the length of the flexible article of manufacture while inverting the flexible article of manufacture.

DETAILED DESCRIPTION

Figure 1:
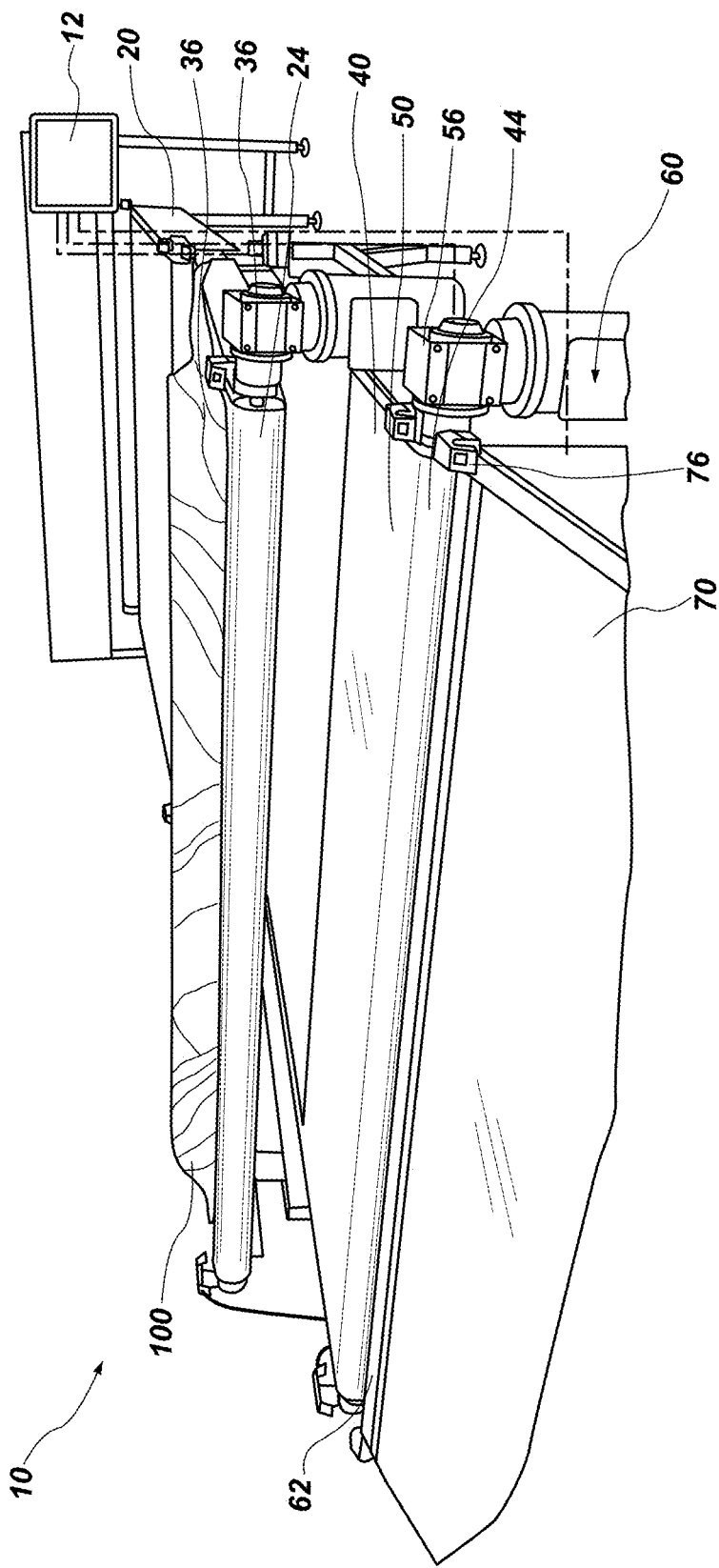
FIG. 1 is a perspective view of an embodiment of an apparatus for inverting a flexible article of manufacture, which apparatus may also be referred to herein as an "inverting apparatus" or as an "inverting conveyor"
Figure 2:
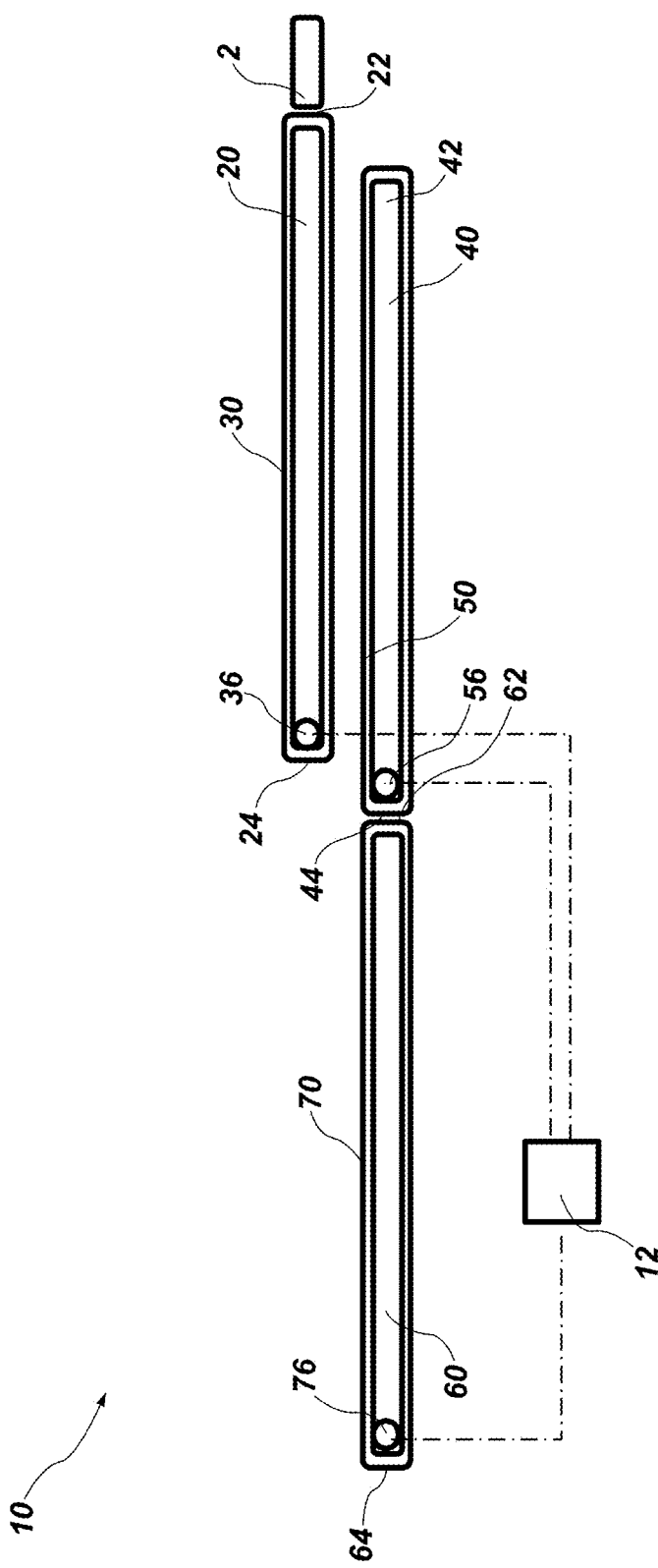
FIG. 2 is a side view of the inverting conveyor of FIG. 1.
Figure 3:
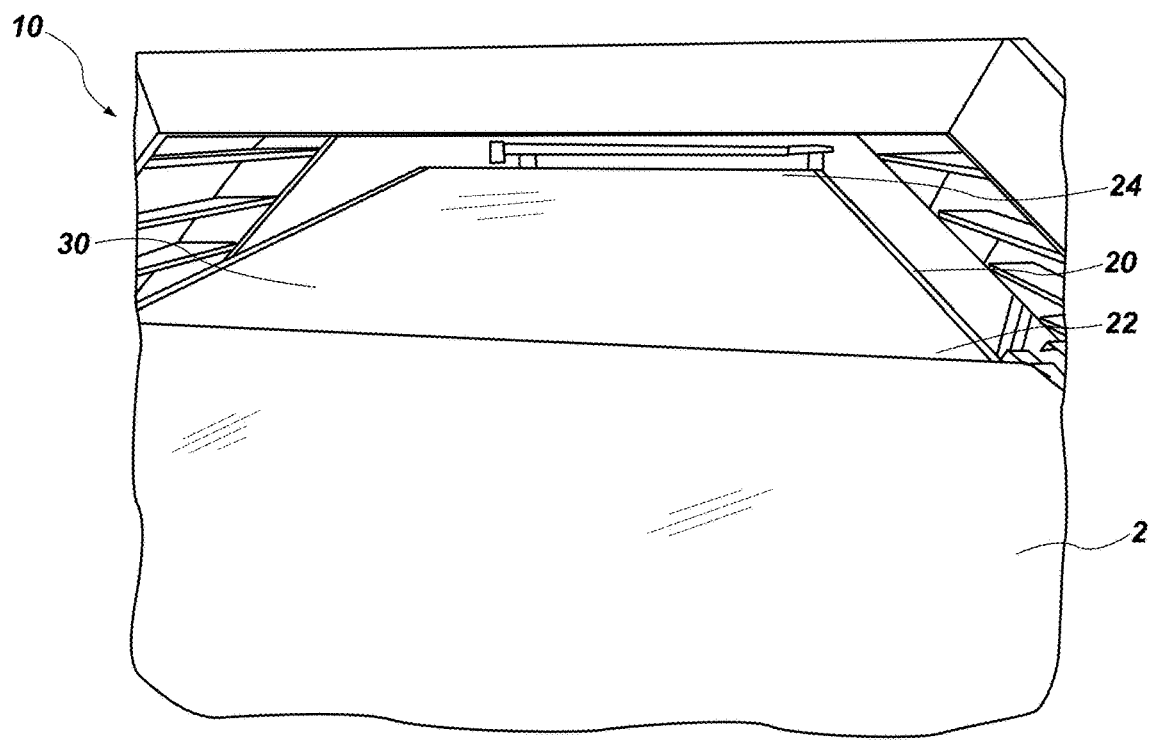
FIG. 3 is a view from a first end, or an infeed end, of the inverting conveyer of FIG. 1.
Figure 4:
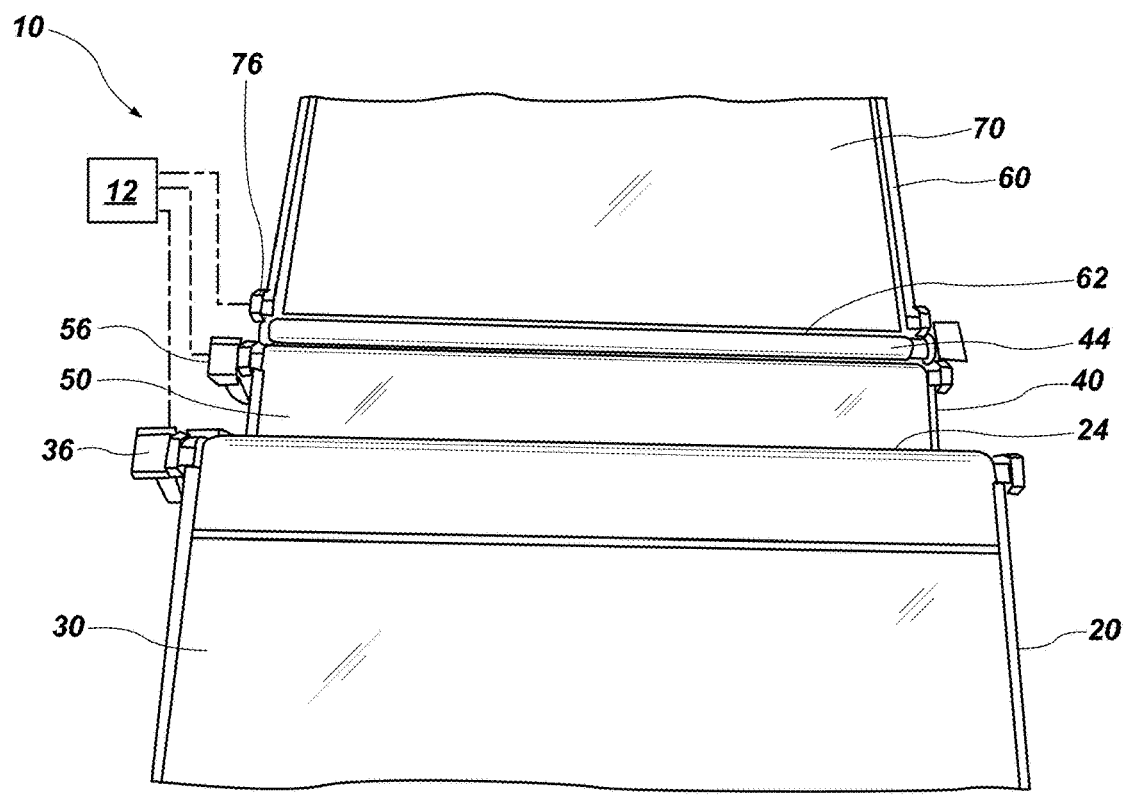
FIG. 4 is a top view of the inverting conveyor of FIG. 1.
Figure 5:
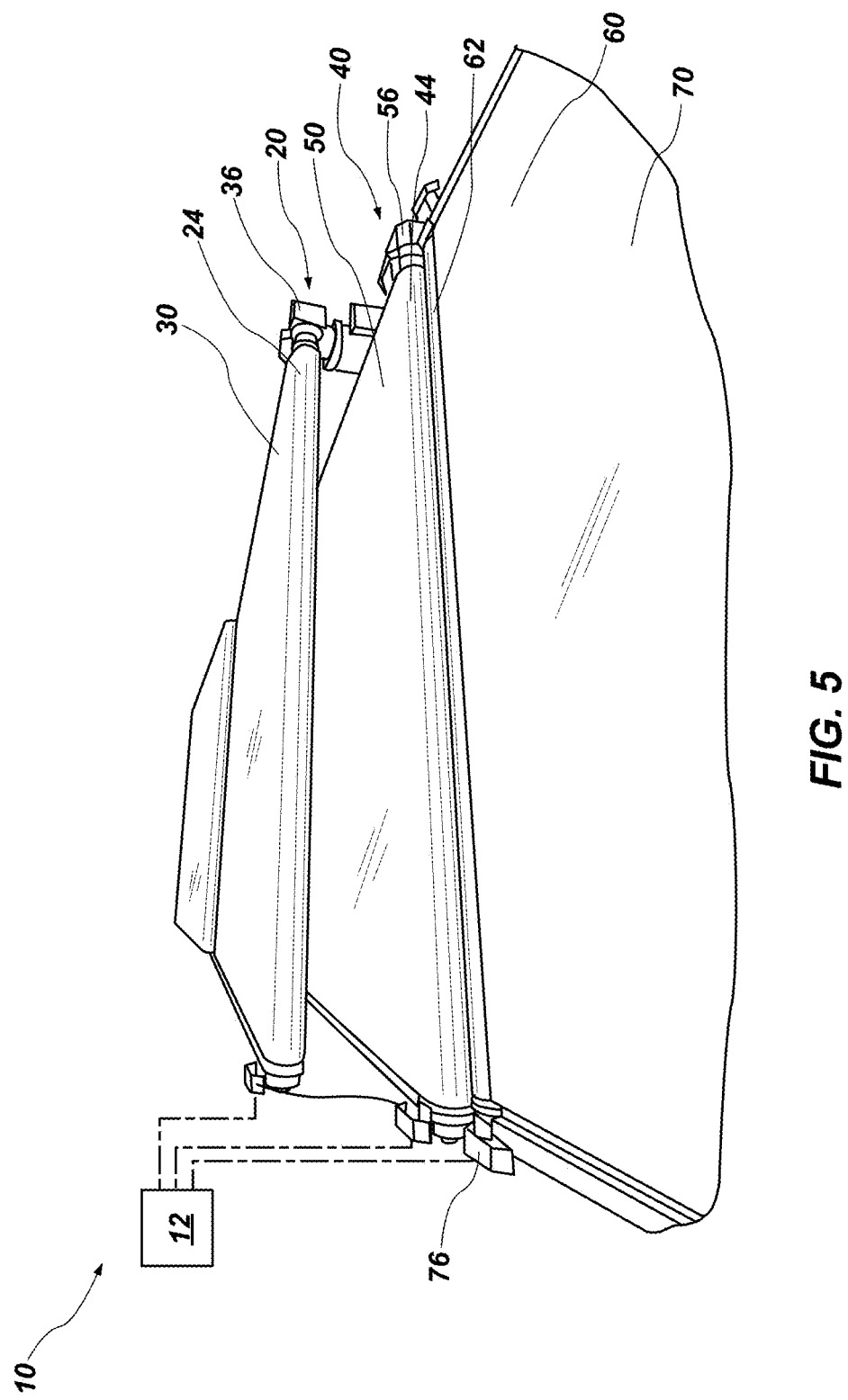
FIG. 5 is a view of a second end, or an outfeed end, of the inverting conveyor of FIG. 1.

FIGS. 1-5 depict an embodiment of an apparatus 10 for inverting a flexible article of manufacture 100 (see also FIGS. 6-16), such as a cushioning element (e.g., of a mattress, etc.) formed from an elastomeric gel. The apparatus 10 shown in FIGS. 1-5 may be referred to as an "inverting apparatus" or as an "inverting conveyor system 10." The inverting conveyor 10 may include a first conveyor 20 and a second conveyor 40. Optionally, the inverting conveyor 10 may also include a third conveyor 60. The first conveyor 20, second conveyor 40, and optional third conveyor 60 may function in concert to invert the flexible article of manufacture 100. In some embodiments, the inverting conveyor system 10 may operate under control of a processor 12, which controls and coordinates operation of the first conveyor 20, second conveyor 40, and optional third conveyor 60.

A width of each of the first conveyor 20, the second conveyor 40, and the optional third conveyor 60 may enable it to receive a width of flexible article of manufacture (e.g., a king size mattress, etc.) the apparatus 10 is designed to invert. Without limitation, the first conveyor 20, the second conveyor 40, and the optional third conveyor 60 may have widths that enable them to receive a flexible article of manufacture 100 having a width of about 38 inches (about 100 cm) to about 86 inches (about 225 cm).

While the first conveyor 20 and the optional third conveyor 60 may have any suitable lengths, the length of the second conveyor 40 may be sufficient to enable the second conveyor 40 to receive substantially an entire length of the flexible article of manufacture 100 (e.g., a king size mattress, a California king size mattress, etc.). Without limitation, the second conveyor 40 may have a length that enables it to completely receive a flexible article of manufacture 100 having a length of at least about 90 inches (about 230 cm).

The first conveyor 20 has a first end 22 and a second end 24 opposite from the first end 22. The first end 22 may receive the flexible article of manufacture 100. For example, the first end 22 may receive the flexible article of manufacture from another conveyor 2 (e.g., of a scrim table, where a scrim fabric 110 was secured to a first surface 108 of the flexible article of manufacture 100, etc.), from a machine that removes the flexible article of manufacture 100 from the location where it was manufactured (e.g., a mold, etc.), directly from the location where the flexible article of manufacture 100 was manufactured, etc. The second end 24 may deliver the flexible article of manufacture 100 to the second conveyor 40.

The first conveyor 20 includes a transporter 30 and a driver 36. The transporter 30 functions under control of the driver 36. The driver 36 may function under control of the processor 12. As the transporter 30 functions, it may move an article, such as a flexible article of manufacture 100, from the first end 22 of the first conveyor 20 to the second end 24 of the first conveyor 20 in a first direction, or in a forward direction. The transporter 30 may include a belt and a belt support, as depicted, or a series of rollers or rotors, a collection of wheels, or the like. The driver 36 may include a drive unit (e.g., a motor, etc.). The drive unit may rotate a pulley or a gear. A linkage (e.g., a belt, a cable, a chain, etc.) may link the pulley or gear to the transporter 30 in a manner that causes the transporter 30 to move in a desired direction. For example, the driver 36 may move an article, such as a flexible article of manufacture 100, on the transporter 30 from the first end 22 of the first conveyor 20 to the second end 24 of the first conveyor 20.

Figure 6:
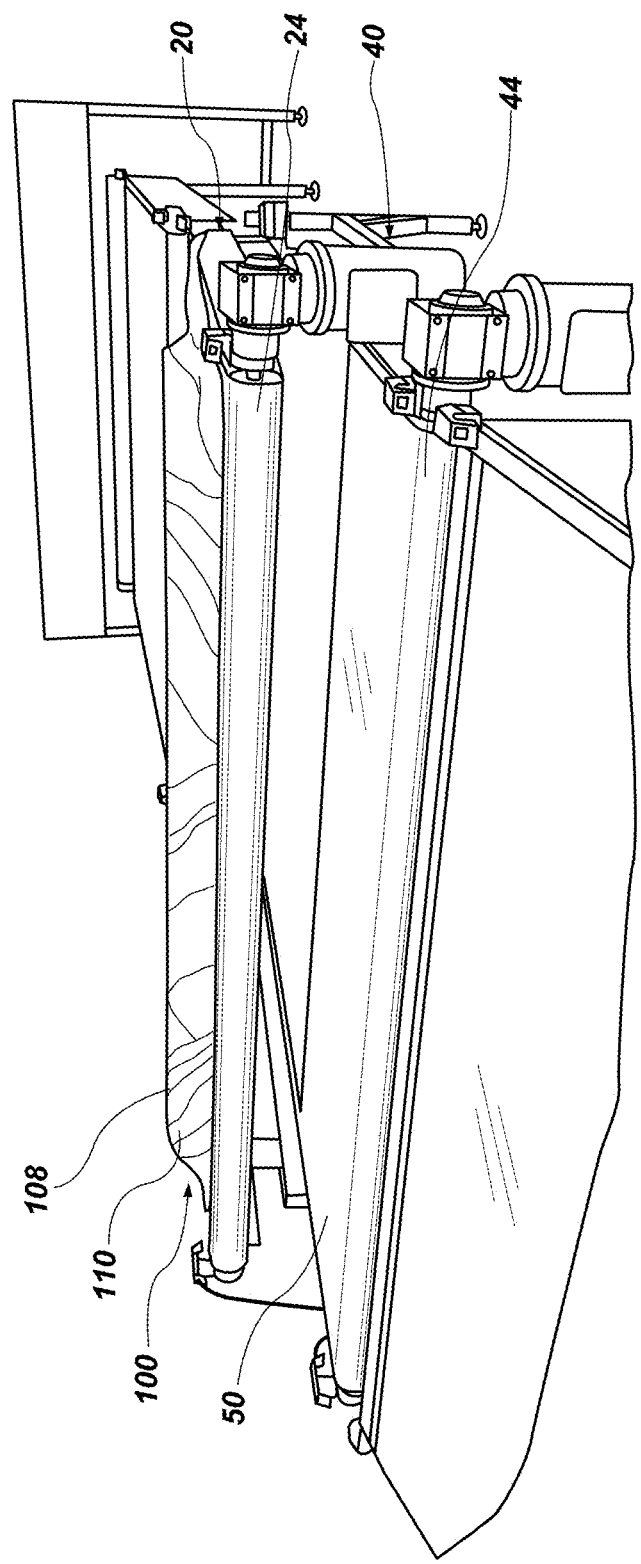
FIGS. 6-16 show use of the inverting conveyor of FIG. 1 to invert a flexible article of manufacture, such as an elastomeric gel cushioning element of a mattress.
Figure 7:
Figure 8:
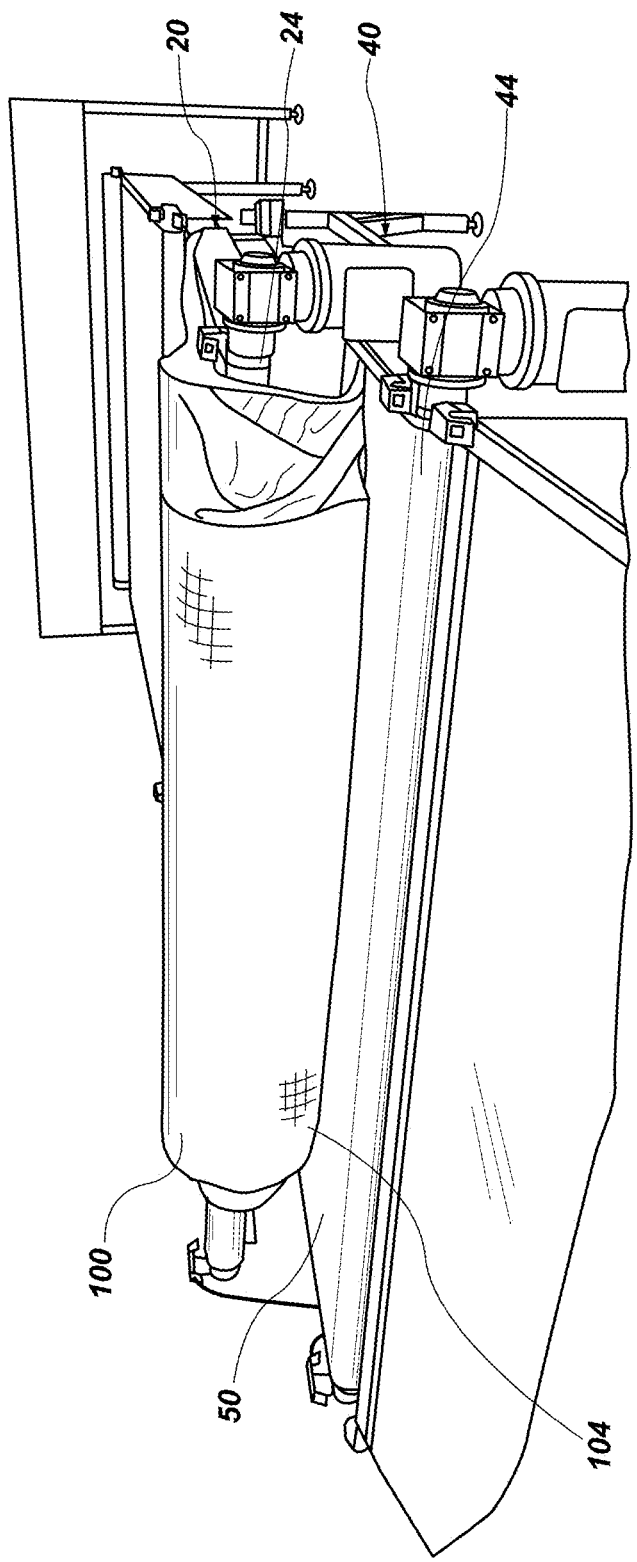

The second end 24 of the first conveyor 20 may be positioned above a portion of the second conveyor 40. More specifically, a second end 44 of the second conveyor 40 may extend beyond the second end 24 of the first conveyor 20, while a first end 42 (not shown) of the second conveyor 40 may be located beneath the first conveyor 20. As a flexible article of manufacture 100 is moved beyond and drops off the second end 24 of the first conveyor 20, as shown in FIGS. 6-8, the flexible article of manufacture 100 may be received by the second conveyor 40 (e.g., at a location adjacent to the second end 44 of the second conveyor 40, as illustrated; at an intermediate location along a length of the second conveyor 40; etc.). More specifically, the flexible article of manufacture 100 may be received by a portion of a transporter 50 of the second conveyor 40.

With continued reference to FIGS. 1-5, in addition to the transporter 50, the second conveyor 40 may include a driver 56. The transporter 50 functions under control of the driver 56. The driver 56 may function under control of the processor 12. The transporter 50 may include a belt and a belt support, as depicted, or a series of rollers or rotors, a collection of wheels, or the like. The driver 56 may include a drive unit (e.g., a motor, etc.). The drive unit may rotate a pulley or a gear. A linkage (e.g., a belt, a cable, a chain, etc.) may link the pulley or gear to the transporter 50 in a manner that causes the transporter 50 to move in a desired direction.

Figure 13:
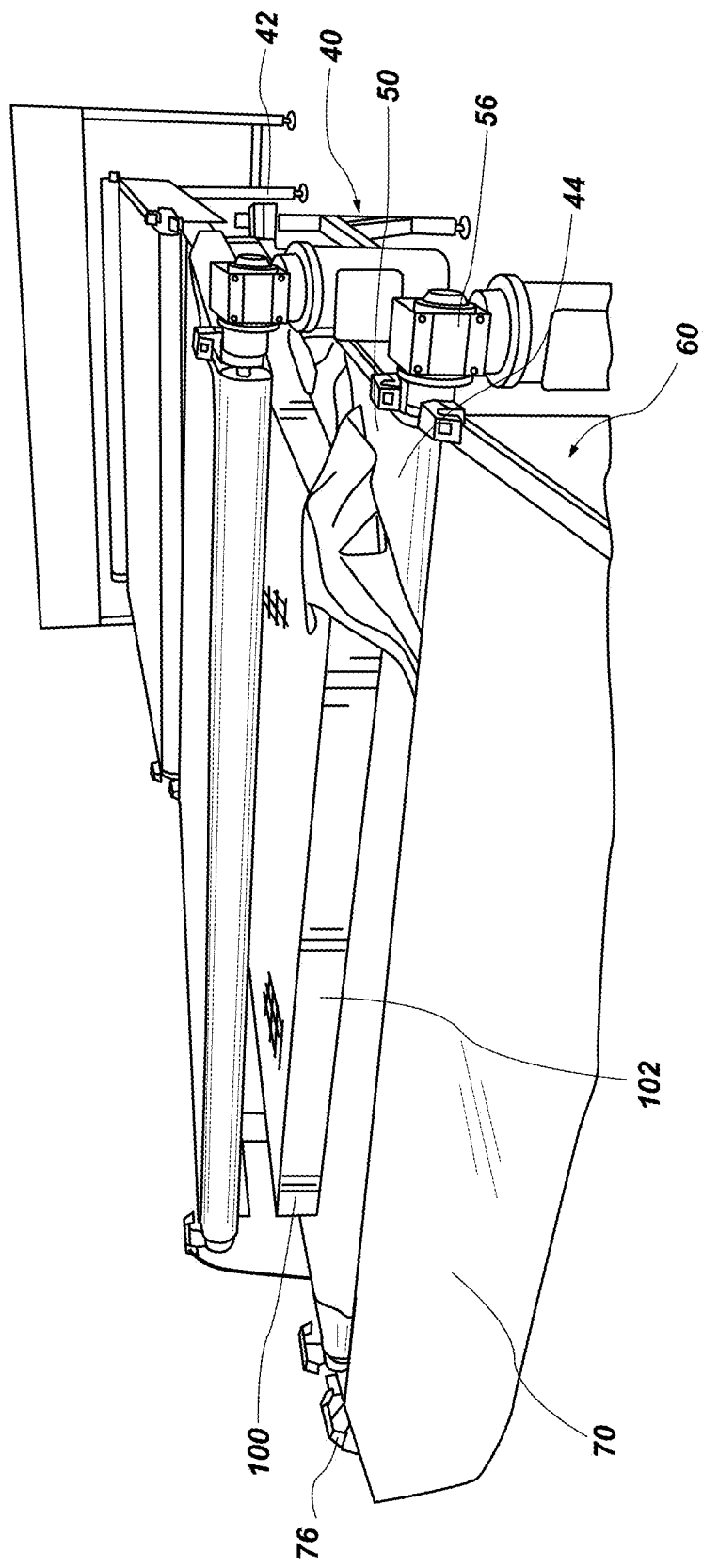
Figure 14:
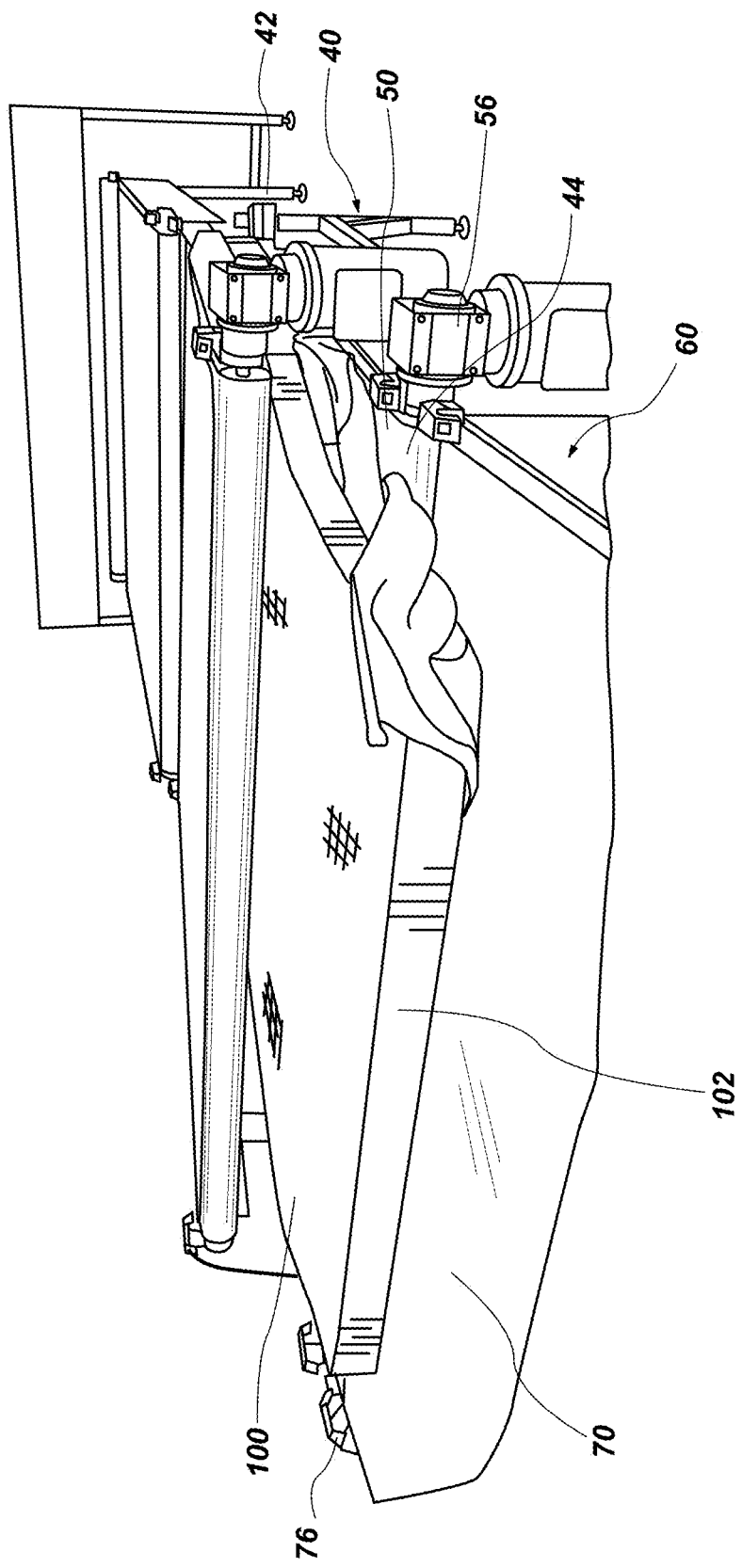
Figure 15:
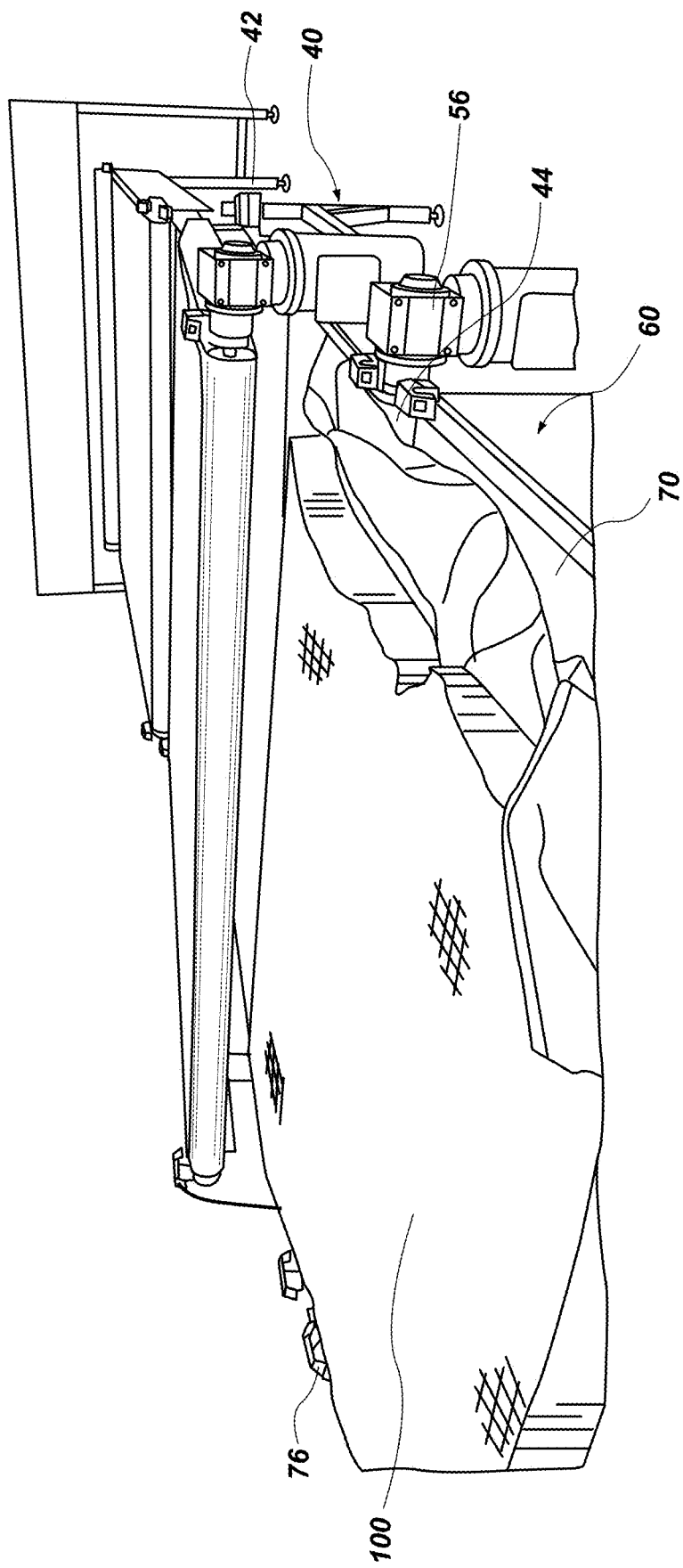

The driver 56 of the second conveyor 40 may selectively (e.g., under control of the processor 12, etc.) cause the transporter 50 to move an article, such as the flexible article of manufacture 100, in a desired direction. Upon receiving the flexible article of manufacture 100, the second conveyor 40 may function in concert with the first conveyor 20. For example, upon receiving the flexible article of manufacture 100, the driver 56 may cause the transporter 50 of the second conveyor 40 to move the inverting flexible article of manufacture 100 in a second direction, or in a reverse direction, toward the first end 42 of the second conveyor 40, as shown in FIGS. 9-12. Once the flexible article of manufacture 100 has been completely inverted and is entirely carried by the transporter 50 of the second conveyor 40, operation of the driver 56 of the second conveyor 40 may be reversed to cause the flexible article of manufacture 100 to move in a first direction, or a forward direction, from the first end 42 of the second conveyor 40 to and beyond the second end 44 of the first second conveyor 40, as shown in FIGS. 13-15.

Still referring to FIGS. 1-5, the optional third conveyor 60 of the inverting conveyor system 10 may be positioned to receive the flexible article of manufacture 100 from the second conveyor 40. More specifically, the third conveyor 60 may be positioned adjacent to the second end 44 of the second conveyor 40.

The third conveyor 60 has a first end 62 and a second end 64 opposite from the first end 62. The first end 62 may receive the flexible article of manufacture 100 from the second conveyor 40 or, more specifically, from the second end 44 of the second conveyor 40. The second end 64 of the third conveyor 60 may deliver the flexible article of manufacture 100 to a desired destination (e.g., for further assembly, packaging, etc.).

The third conveyor 60 includes a transporter 70 and a driver 76. The transporter 70 functions under control of the driver 76. The driver 76 may function under control of the processor 12. As the transporter 70 functions, it may move the flexible article of manufacture 100 from the first end 62 of the third conveyor 60 to the second end 64 of the third conveyor 60 in a first direction, or in a forward direction. The transporter 70 may include a belt and a belt support, as depicted, or a series of rollers or rotors, a collection of wheels, or the like. The driver 76 may include a drive unit (e.g., a motor, etc.). The drive unit may rotate a pulley or a gear. A linkage (e.g., a belt, a cable, a chain, etc.) may link the pulley or gear to the transporter 70 in a manner that causes the transporter 70 to move in a desired direction. For example, the driver 76 may move an article, such as a flexible article of manufacture 100, on the transporter 70 from the first end 62 of the third conveyor 60 to the second end 64 of the third conveyor 60.

The driver 76 of the third conveyor 60 may selectively (e.g., under control of the processor 12, etc.) cause the transporter 70 to move an article, such as the flexible article of manufacture 100, in a first direction, or a forward direction, away from the second conveyor 40. Upon receiving the flexible article of manufacture 100, the third conveyor 60 may function in concert with the second conveyor 40. For example, as the driver 56 of the second conveyor 40 causes the transporter 50 of the second conveyor 40 to move the flexible article of manufacture 100 to and beyond the second end 44 of the second conveyor 40, the driver 76 of the third conveyor 60 may also cause the transporter 70 of the third conveyor 60 to move the flexible article of manufacture 100 in the first direction, toward the second end 64 of the third conveyor 60, as shown in FIGS. 13-15. The third conveyor 60 may start to function (i.e., movement of the transporter 70 of the third conveyor 60 may begin) just before or at about the same time the first end 62 of the third conveyor 60 receives the flexible article of manufacture 100.

Figure 16:
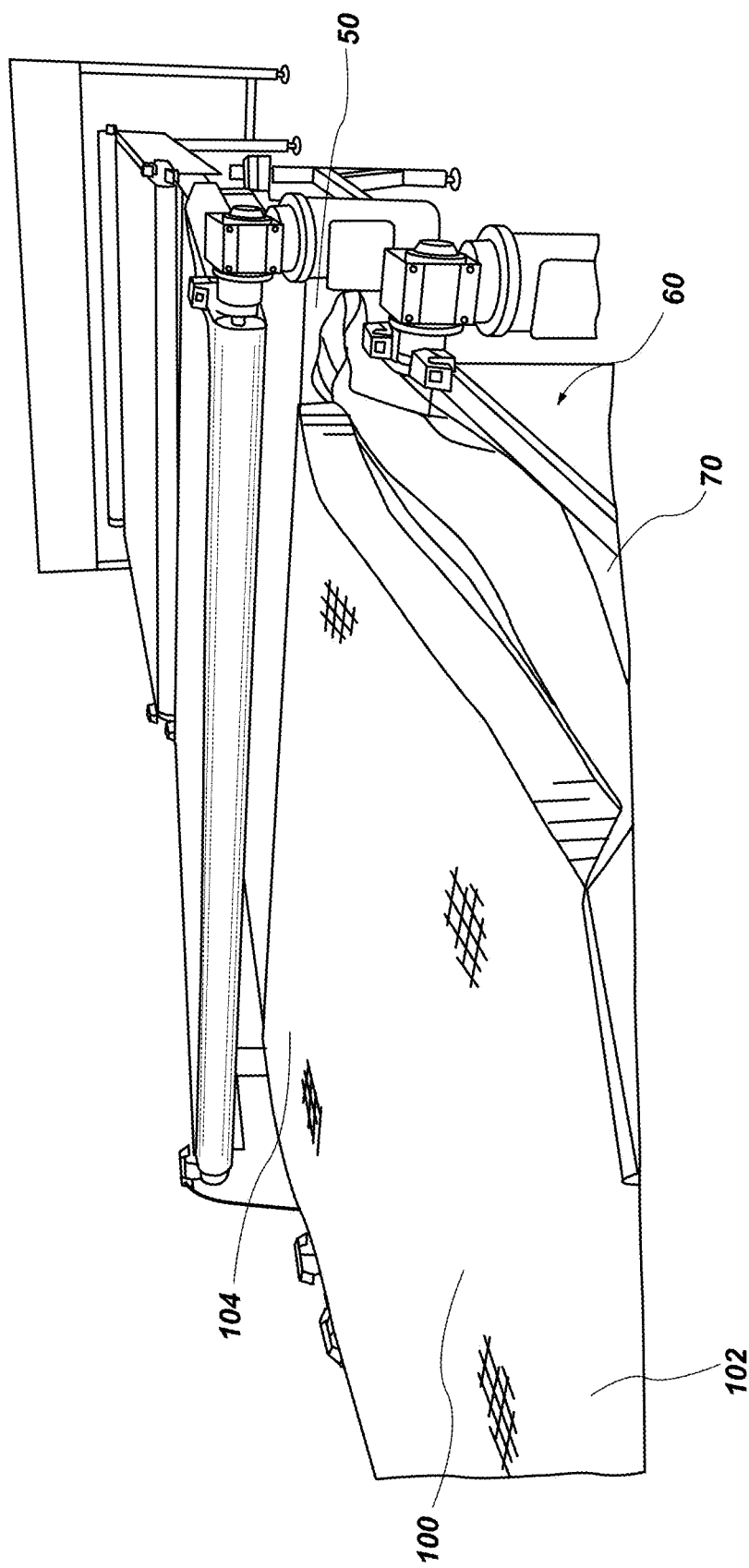

As shown in FIG. 15, the flexible article of manufacture 100 may be laterally compressed or gather as it is transferred from the second conveyor 40 to the third conveyor 60. Once a sufficient portion (e.g., at least half, a majority, etc.) of the flexible article of manufacture 100 is on the transporter 70 of the third conveyor 60 but a trailing end 104 of the flexible article of manufacture 100 remains on the transporter 50 of the second conveyer 40, the second conveyor 40 may stopped, or movement of the transporter 50 of the second conveyor 40 in the first direction may be terminated, while the transporter 70 of the third conveyor 60 may continue to move in the first direction. As seen in FIG. 16, such movement may remove any gathering or compression that has occurred along the length of the flexible article of manufacture 100, which may elongate the flexible article of manufacture 100 (i.e., increase a distance between ends 102 and 104 (e.g., a leading end 102 and a trailing end 104, etc.) of the flexible article of manufacture 100, etc.).

With reference returned to FIG. 6-16, an embodiment of a method for inverting a flexible article of manufacture 100 (e.g., an elastomeric cushioning element, such as a cushioning element of a mattress, etc.) is shown and described. FIG. 6 shows the first conveyor 20 of the inverting conveyor system 10 receiving the flexible article of manufacture 100 in a first orientation (e.g., an upside-down orientation, etc.). As illustrated, the first conveyor 20 may receive the flexible article of manufacture 100 with a scrim fabric 110 on an upward facing surface (e.g., a first surface 108, etc.) of the flexible article of manufacture 100.

As shown in FIG. 7, the transporter 30 and driver 36 (FIGS. 1-5) of the first conveyor 20 move the flexible article of manufacture 100 in the first direction, or a forward direction, beyond the second end 24 of the first conveyor 20. As the transporter 30 of the first conveyor 20 moves an end 104 of the flexible article of manufacture 100 beyond the second end 24 of the first conveyor 20, the end 104 of the flexible article of manufacture 100 drops onto the transporter 50 of the second conveyor 40 at a location adjacent to the second end 44 of the second conveyor 40.

Figure 9:
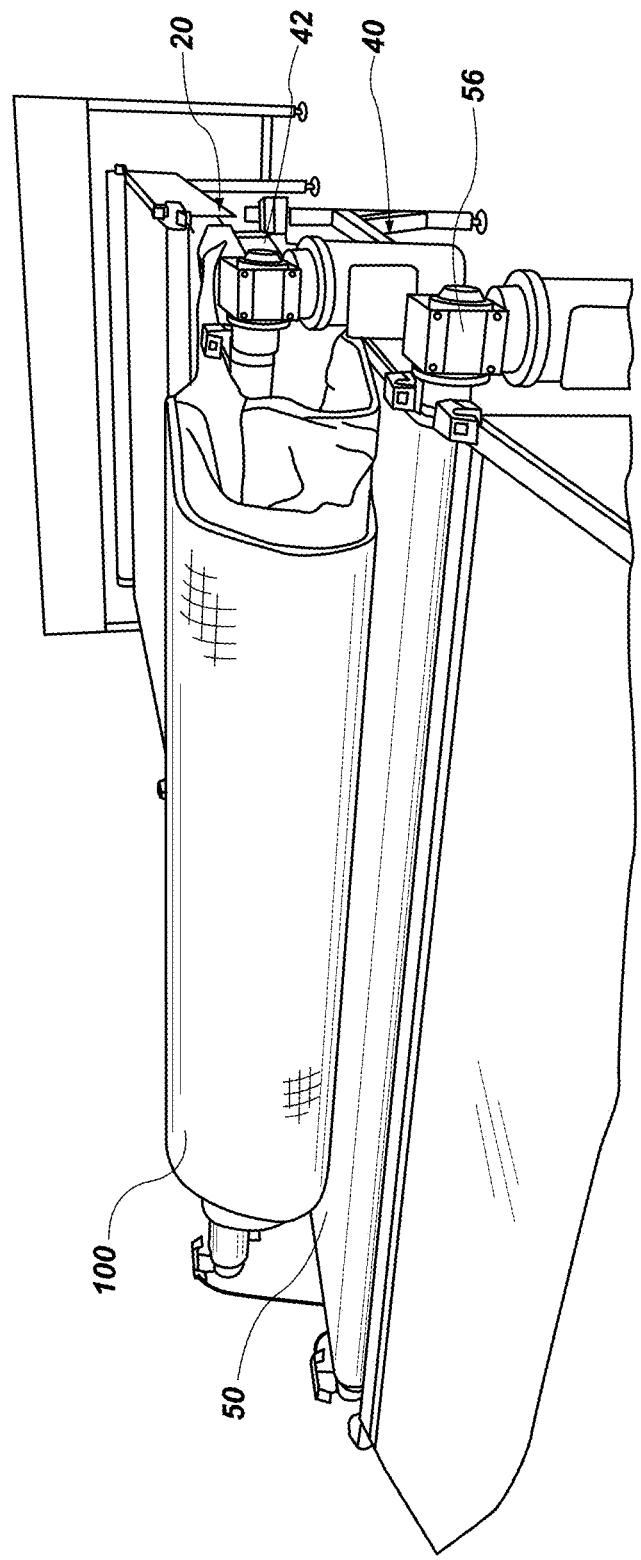

In FIGS. 8 and 9, as the transporter 50 of the second conveyor 40 receives the end 104 of the flexible article of manufacture 100, the driver 56 of the second conveyor 40 moves the transporter 50 of the second conveyor 40 and the end 104 and subsequently received portions of the flexible article of manufacture 100 in the second direction, or a reverse direction, progressively inverting the flexible article of manufacture 100. As the transporter 50 moves in the second direction, the scrim fabric 110 is positioned against the transporter 50 and the previously upward facing surface (e.g., the first surface 108, etc.) of the portion of the flexible article of manufacture 100 on the transporter 50 faces downwardly. An opposite surface (e.g., a second surface 106 (see FIG. 11)) of the portion of the flexible article of manufacture 100 on the transporter 50 faces upwardly.

Figure 10:
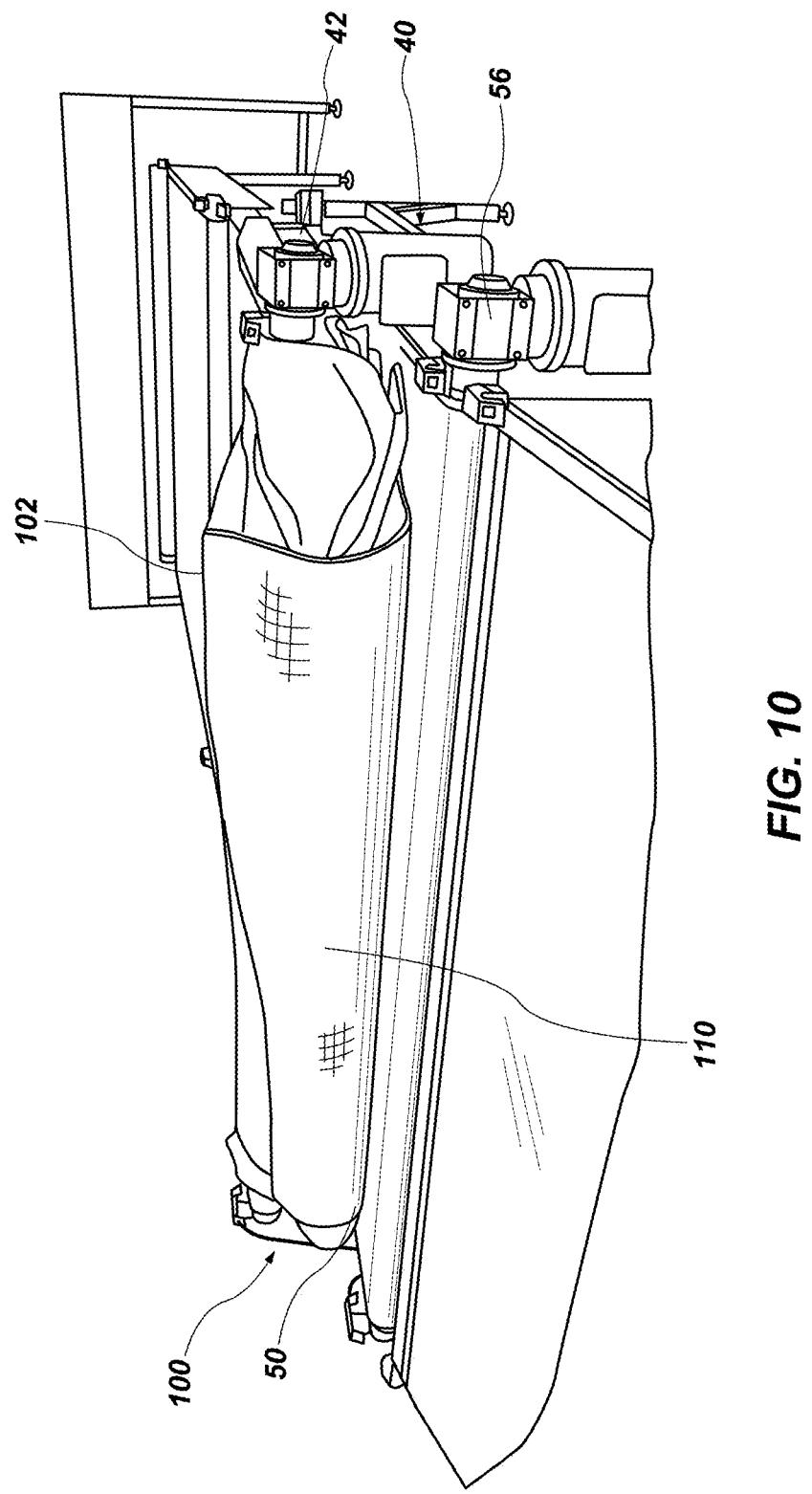
Figure 11:
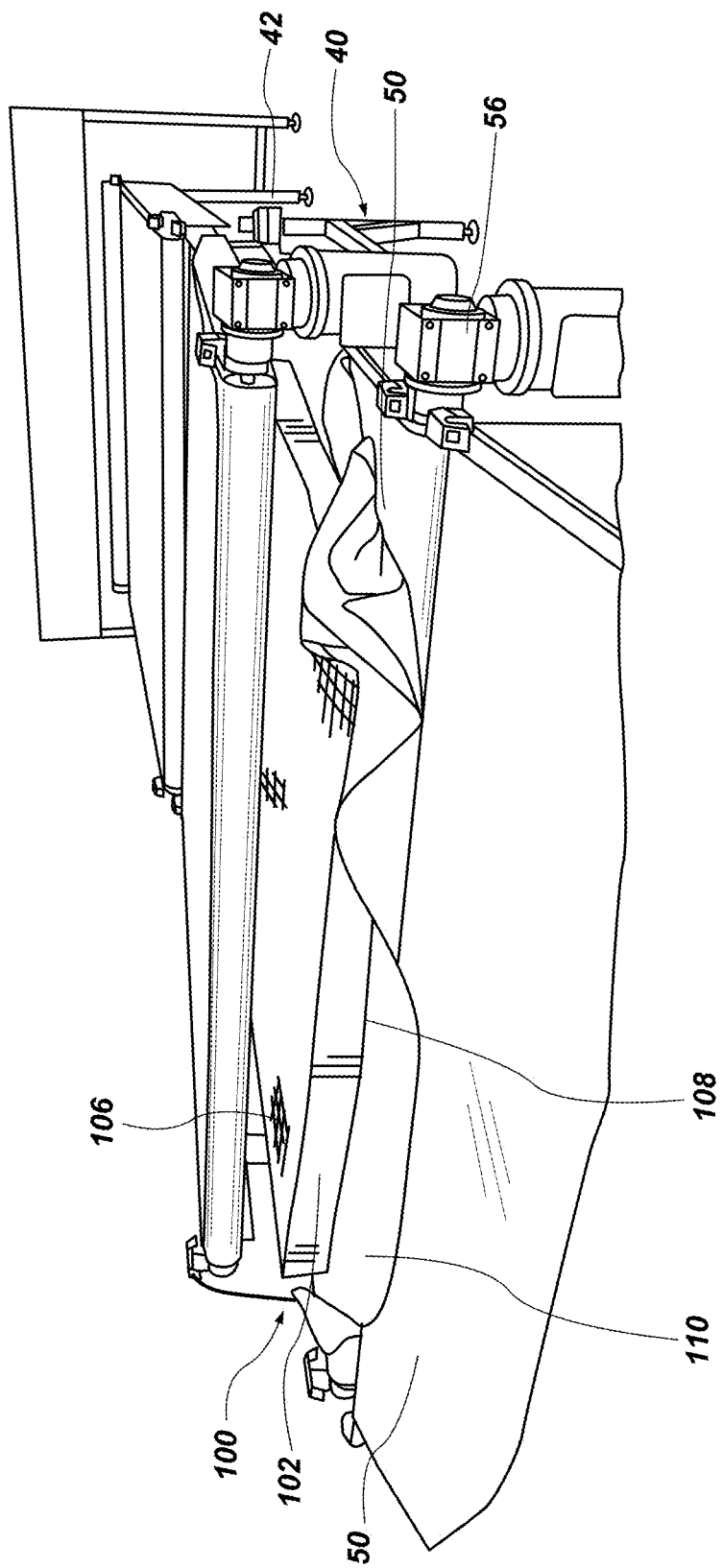
Figure 12:
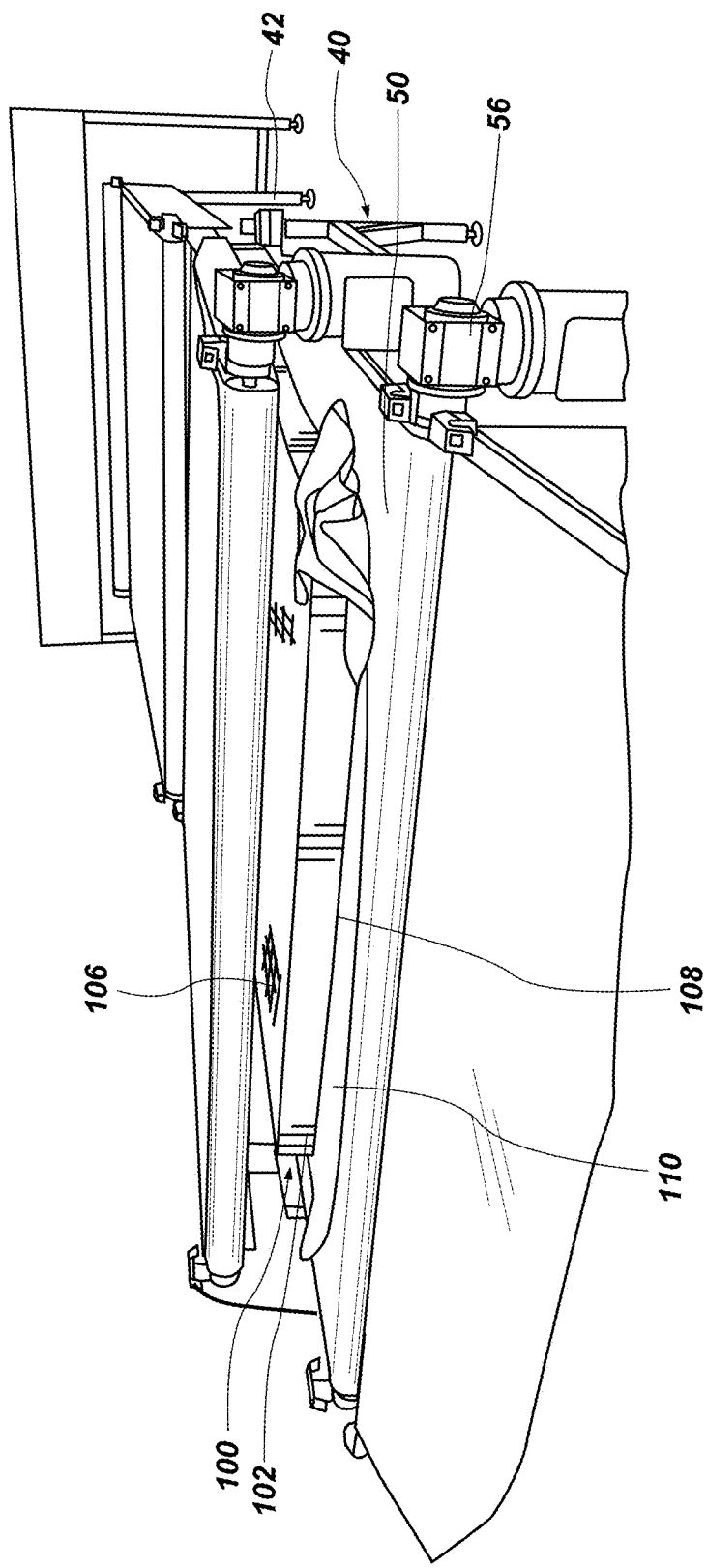

As seen in FIGS. 10-12, movement of the transporter 50 of the second conveyor 40 continues in the second direction until the entire article of manufacture 100 has been inverted (see FIG. 11) and is carried by the transporter 50 (see FIG. 12). The scrim fabric 110 is positioned against the transporter 50, the previously upward facing surface (e.g., the first surface 108, etc.) faces downwardly, toward the transporter 50, and the opposite surface (e.g., the second surface 106 (see FIG. 11), etc.) faces upwardly, away from the transporter 50.

After the flexible article of manufacture 100 has been completely received by the transporter 50 of the second conveyor 40, the driver 56 of the second conveyor 40 (e.g., under control of the processor 12 (see FIGS. 1, 2, 4, and 5) quits moving the transporter 50 in the second direction and begins moving the transporter 50 in the first direction, or a forward direction, as shown in FIG. 13. By reversing movement of the transporter 50 from the second direction to the first direction, the transporter 50 may carry the flexible article of manufacture 100 to the optional third conveyor 60. More specifically, the transporter 50 of the second conveyor 40 may move the flexible article of manufacture 100 onto the transporter 70 of the third conveyor 60.

As the transporter 70 of the third conveyor 60 receives an end 102 of the flexible article of manufacture 100, the driver 76 of the third conveyor 60 may move the transporter 70 and the portion of the flexible article of manufacture 100 carried thereby in the first direction, or a forward direction, as shown in FIG. 14.

As the flexible article of manufacture 100 moves from the second conveyor 40 to the third conveyor 60, it may be laterally compressed or gather, as seen in FIG. 15. In some embodiments and as illustrated by FIG. 16, any gathering or compression that has occurred along the length of the flexible article of manufacture 100 may be removed and the flexible article of manufacture 100 may be elongated (i.e., a distance between ends 102 and 104 (e.g., a leading end 102 and a trailing end 104, etc.) of the flexible article of manufacture 100 may be increased, etc.). For example, once a sufficient portion (e.g., at least half, a majority, etc.) of the flexible article of manufacture 100 is on the transporter 70 of the third conveyor 60 but a trailing end 104 of the flexible article of manufacture 100 remains on the transporter 50 of the second conveyer 40, movement of the transporter 50 of the second conveyor 40 in the first direction may be terminated while the transporter 70 of the third conveyor 60 may continue to move in the first direction. Once the flexible article of manufacture 100 has been elongated, the transporter 70 of the third conveyor 60 may carry the flexible article of manufacture 100 to a desired location.

Figure 17:
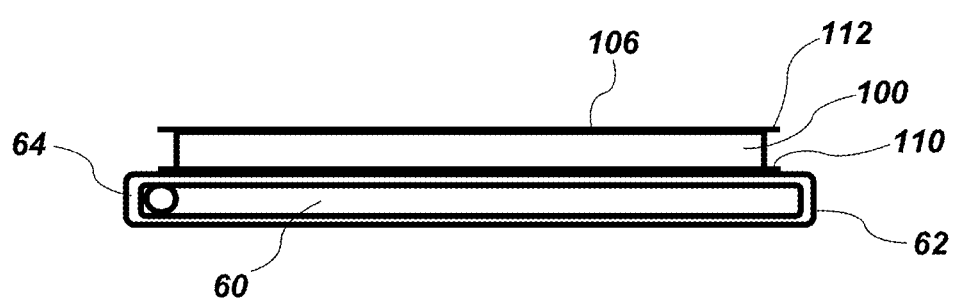
FIG. 17 depicts an embodiment of a further process that may be conducted on the flexible article of manufacture.

FIG. 17 depicts a specific embodiment of such further processing where the flexible article of manufacture 100 comprises a cushioning element formed from an elastomeric gel. With the flexible article of manufacture 100 inverted, the scrim fabric 110 or other support material on which the flexible article of manufacture 100 was formed may be located beneath the flexible article of manufacture 100 (e.g., on its downwardly facing first surface 108, etc.). With the opposite surface (e.g., the second surface 106, etc.) of the flexible article of manufacture 100 exposed (e.g., facing upwardly, etc.), another scrim fabric 112 or other support material may be placed on (e.g., by way of a scrim feeder, etc.) and secured to (e.g., with an adhesive, by melt bonding, etc.) the exposed surface in a manner known in the art.

While this disclosure is made with respect to certain illustrated embodiments, those of ordinary skill in the art will recognize and appreciate that the disclosure is not limited to the illustrated embodiments. Additions, deletions, modifications to the illustrated embodiments may be made without departing from the scope of the disclosure. In addition, features from one embodiment may be combined with features of another embodiment. Further, embodiments of the disclosure have utility with different and various types of mattresses and other cushions.

What is claimed:

1. An apparatus for inverting a flexible article of manufacture, comprising:
   a first conveyor that:
      receives the flexible article of manufacture in a first orientation;
      moves the flexible article of manufacture in a first direction, wherein the flexible article of manufacture includes a scrim fabric on a first surface thereof upon conveying the flexible article of manufacture in the first direction with the flexible article of manufacture in the first orientation; and
      includes an end from which a first end of the flexible article of manufacture drops while the first conveyor moves the flexible article of manufacture in the first direction; and
   a second conveyor that:
      is positioned partially beneath the first conveyor, with an end portion of the second conveyor extending laterally beyond the end of the first conveyor;
      receives the first end of the flexible article of manufacture; and
      moves in a second direction opposite from the first direction of the first conveyor to progressively invert the flexible article of manufacture to a second orientation, and supports the flexible article of manufacture while another scrim fabric is secured to a second surface of the flexible article of manufacture after progressively freeing the flexible article of manufacture from movement in the first direction while progressively conveying progressively freed portions of the flexible article of manufacture in the second direction to progressively invert the progressively freed portions of the flexible article of manufacture from the first orientation to the second orientation.

2. The apparatus of claim 1, wherein the second conveyor further:
   upon receiving a second end of the flexible article of manufacture opposite from the first end of the flexible article of manufacture, moves in the first direction to convey the flexible article of manufacture in the second orientation.

3. The apparatus of claim 2, further comprising:
   a third conveyor that:
      receives the flexible article of manufacture from the second conveyor; and
      conveys the flexible article of manufacture in the first direction.

4. The apparatus of claim 3, wherein:
   the second conveyer:
      stops conveying the flexible article of manufacture in the first direction while the third conveyor conveys the second end of the flexible article of manufacture in the first direction and the first end of the flexible article of manufacture remains on the second conveyor; and
   the third conveyor:
      continues to convey the flexible article of manufacture in the first direction while the second conveyor stops conveying the first end of the flexible article of manufacture and the first end of the flexible article of manufacture remains on the second conveyor to enable elongation of the flexible article of manufacture from the second end to the first end.

5. The apparatus of claim 1, wherein the flexible article of manufacture comprises a molded elastomeric cushioning element.

6. The apparatus of claim 5, wherein the molded elastomeric cushioning element comprises an elastomeric cushioning element for a mattress.

7. The apparatus of claim 1, wherein the first orientation of the flexible article of manufacture is an upside-down orientation and the second orientation of the flexible article of manufacture is an upright orientation.

8. An apparatus for transporting an elastomeric cushioning element of a mattress, comprising:
   a first conveyor that:
      receives the elastomeric cushioning element in a first orientation, with a scrim fabric on an upward facing surface of the elastomeric cushioning element;
      moves the elastomeric cushioning element in a first direction; and
      includes an end from which a first end of the elastomeric cushioning element drops while the first conveyor moves the elastomeric cushioning element in the first direction; and
   a second conveyor that:
      is positioned partially beneath the first conveyor, with an end portion of the second conveyor extending laterally beyond the end of the first conveyor;
      receives the first end of the elastomeric cushioning element; and
      moves in a second direction opposite from the first direction of the first conveyor to progressively invert the elastomeric cushioning element to a second orientation, with the scrim fabric on a downward facing surface of the elastomeric cushioning element, and supports the elastomeric cushioning while another scrim fabric is secured to a second surface of the elastomeric cushioning element after progressively freeing the elastomeric cushioning element from movement in the first direction while progressively conveying progressively freed portions of the elastomeric cushioning in the second direction to progressively invert the progressively freed portions of the elastomeric cushioning element from the first orientation to the second orientation.

9. The apparatus of claim 8, wherein the second conveyor further:
upon receiving a second end of the elastomeric cushioning element opposite from the first end of the elastomeric cushioning element, moves in the first direction to convey the elastomeric cushioning element in the second orientation.

10. The apparatus of claim 8, further comprising:
a third conveyor that:
receives the elastomeric cushioning element from the second conveyor; and
conveys the elastomeric cushioning element in the first direction.

11. The apparatus of claim 10, wherein:
the second conveyer:
stops conveying the elastomeric cushioning element in the first direction while the third conveyor conveys the second end of the elastomeric cushioning element in the first direction and the first end of the elastomeric cushioning element remains on the second conveyor; and
the third conveyor:
continues to convey the elastomeric cushioning element in the first direction while the second conveyor stops conveying the first end of the elastomeric cushioning element and the first end of the elastomeric cushioning element remains on the second conveyor to enable elongation of the elastomeric cushioning element from the second end to the first end.

12. A method for conveying an elastomeric cushioning element, comprising:
conveying the elastomeric cushioning element in a first direction with the elastomeric cushioning element in a first orientation, wherein the elastomeric cushioning element includes a scrim fabric on a first surface thereof upon conveying the elastomeric cushioning element in the first direction with the elastomeric cushioning element in the first orientation;
freeing a first end of the elastomeric cushioning element;
conveying the first end of the elastomeric cushioning element in a second direction opposite from the first direction while continuing to convey a remainder of the elastomeric cushioning element in the first direction to invert the elastomeric cushioning element from the first orientation to a second orientation opposite from the first orientation at the first end;
progressively freeing the elastomeric cushioning element from movement in the first direction while progressively conveying progressively freed portions of the elastomeric cushioning in the second direction to progressively invert the progressively freed portions of the elastomeric cushioning element from the first orientation to the second orientation; and
securing another scrim fabric to a second surface of the elastomeric cushioning element after progressively freeing the elastomeric cushioning element from movement in the first direction while progressively conveying progressively freed portions of the elastomeric cushioning in the second direction to progressively invert the progressively freed portions of the elastomeric cushioning element from the first orientation to the second orientation.

13. The method of claim 12, wherein progressively freeing the elastomeric cushioning element continues until a second end of the elastomeric cushioning element is freed, inverted to the second orientation, and conveyed in the second direction.

14. The method of claim 12, further comprising:
with the elastomeric cushioning element in the second orientation, conveying the elastomeric cushioning element in the first direction.

15. The method of claim 14, wherein conveying the elastomeric cushioning element in the first direction occurs once an entirety of the elastomeric cushioning element has been inverted from the first orientation to the second orientation.

16. The method of claim 15, further comprising:
with the elastomeric cushioning element in the second orientation, continuing to convey the second end of the elastomeric cushioning element in the first direction without conveying the first end of the elastomeric cushioning element in the first direction.

17. The method of claim 16, wherein continuing to convey the second end of the elastomeric cushioning element in the first direction without conveying the first end of the elastomeric cushioning element in the first direction enables elongation of the elastomeric cushioning element between the second end and the first end.

18. The method of claim 12, wherein the first orientation of the elastomeric cushioning element is an upside-down orientation and the second orientation of the elastomeric cushioning element is an upright orientation.

19. The method of claim 12, wherein the elastomeric cushioning element comprises a molded elastomeric cushioning element.

20. The method of claim 12, wherein the elastomeric cushioning element comprises an elastomeric cushioning element for a mattress.

21. The method of claim 20, wherein the elastomeric cushioning element for the mattress includes a scrim fabric on a major surface thereof.

* * * * *